(12) United States Patent
Iliev (10) Patent No.: US 8,165,214 B2
(45) Date of Patent: Apr. 24, 2012

(54) CIRCUIT AND METHOD FOR GENERATING FIXED POINT VECTOR DOT PRODUCT AND MATRIX VECTOR VALUES

(75) Inventor: Nickolai J. Iliev, Round Lake, IL (US)

(73) Assignee: Freescale Semiconductor, Inc., Austin, TX (US)

(*) Notice: Subject to any disclaimer, the term of this patent is extended or adjusted under 35 U.S.C. 154(b) by 1386 days.

(21) Appl. No.: 11/745,875

(22) Filed: May 8, 2007

(65) Prior Publication Data

US 2008/0279274 A1  Nov. 13, 2008

(51) Int. Cl.
*H04N 11/02* (2006.01)
(52) U.S. Cl. ............ 375/240.2; 375/240.01; 375/240.18
(58) Field of Classification Search ............. 375/240.01, 375/240.03, 240.18, 240.2
See application file for complete search history.

(56) References Cited

U.S. PATENT DOCUMENTS

| | | | |
|---|---|---|---|
| 3,814,917 A | 6/1974 | Nussbaumer | |
| 6,202,074 B1 | 3/2001 | Lipka | |
| 6,282,556 B1 * | 8/2001 | Chehrazi et al. | 708/521 |
| 6,411,647 B1 | 6/2002 | Chan | |
| 6,427,157 B1 | 7/2002 | Webb | |
| 6,427,158 B1 | 7/2002 | Wang et al. | |
| 6,570,907 B1 | 5/2003 | Dent et al. | |
| 2006/0215768 A1 * | 9/2006 | Kerofsky | 375/240.28 |

* cited by examiner

*Primary Examiner* — Edward Zee (57) ABSTRACT

An integrated circuit (102) and method computes fixed point vector dot products (424) and/or matrix vector products using a type of distributed architecture that loads bit planes (add 00-add30) and uses the loaded bit planes to generate a plurality of partial products (416-422) directly, such as without a lookup table, and the plurality of partial products are computed in real time and are not read out of addressable memory. In one example, pixel coefficients and corresponding data are loaded such that, for example, a bit plane is loaded to generate partial product results on a per bit plane basis. The plurality of partial products are then summed (414) or accumulated to produce fixed point vector dot product data (424).

19 Claims, 8 Drawing Sheets

CIRCUIT AND METHOD FOR GENERATING FIXED POINT VECTOR DOT PRODUCT AND MATRIX VECTOR VALUES

FIELD

This disclosure relates generally to apparatus and methods for generating fixed point vector dot products and/or matrix vector products in data processing systems.

BACKGROUND

Fixed point vector dot product calculations and matrix vector products are often required in video processing and audio processing circuits such as MPEG codecs, audio or video filters, or any other application that requires the generation of vector dot products and matrix vectors as part of filtering operations or other suitable operations to produce, for example, data representing pixel information, audio information, or any other suitable information. For example, handheld or non-handheld video image display devices such as, but not limited to, cameras, cell phones, PDAs, digital medial players or devices that render video streams or play DVDs, process information that has been coded or needs to be decoded in some fashion wherein the decoding or filtering process utilizes fixed point vector dot product and/or matrix vector product operations. For example, MPEG decoders may, for example, utilize discrete cosine transform circuits that generate discrete cosine transform coefficient matrices that must be processed to eventually produce pixels for display on a display of a device. However, known video decoders, finite impulse response (FIR) filters and other circuits typically employ a type of lookup table (addressable ROM) that may be used, for example, to store partial product values. The use of lookup tables (ROM) can greatly increase the cost of devices. In other systems, coefficients and data may be received serially from ROM, one bit at a time, and the data and coefficients are serially multiplied to produce fixed point vector dot products that are used to further generate information for display or output. Again, the use of ROM can be costly.

Other processes are known that use dedicated non-distributed multipliers, clocked accumulators and clocked shift registers to store partial sums of the output sample. However, the use of clocked shift registers or clocked accumulators can also add to the complexity and cost due to additional real estate required or other factors.

Other devices may, for example, integrate a finite impulse response filter with a digital analog converter decoder logic in a ROM device. Finite impulse response output values are obtained from the ROM device. As such, existing integrated circuits, for example, use ROM lookup tables that store partial sum values. In the context of, for example, MPEG video decoders the possible coefficients and corresponding partial products may be expected and when a particular data pattern is received and the coefficients are provided, they are used to lookup the partial product values in a lookup table so very little computation is employed. However, the ROM and corresponding circuitry necessary to perform the operations may not be desirable due to potential costs in terms of excessive real estate that the ROM may use up in an integrated circuit, and additional other costs. For example, ROMs may also have additional leakage current problems and data corruption problems and ROM circuits may need to have built in test logic (BIST) for the memory which can also take up additional space on an integrated circuit and require additional power.

Therefore, a need exists for an improved architecture and method for generating vector dot products and matrix vector products to facilitate video/audio processing or other data processing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Briefly, an integrated circuit and method computes fixed point vector dot products and/or matrix vector products using a type of distributed architecture that loads bit planes of data and uses the loaded bit planes to generate a plurality of partial products directly, such as without a lookup table, and the plurality of partial products are computed in real time and are not read out of addressable memory. In one example, the coefficients and corresponding data are loaded such that, for example, a bit plane is loaded to generate partial product results on a per bit plane basis. The plurality of partial products are then summed or accumulated to produce fixed point vector dot product data.

For example, an N-bit parallel data stream is filtered, such as by generating vector dot product data using a data vector and a coefficient vector, without using dedicated digital multipliers, clocked shift registers and addressable storage devices, such as addressable ROM or RAM, that stores pre-computed filter outputs or partial sums. Instead, a vector dot product is generated, for example, wherein a 4×1 data vector is formed by collecting four data values for four successive time steps. Filter coefficients are stored in a 1×4 vector implemented as a register. Data and coefficient values are signed and use two's compliment fractions. In one example, each bit of a 4×1 data vector is used to select a coefficient or zero value and a partial product or partial sum is formed for each bit of the 4×1 data vector. A partial sum or partial product is also formed with the sign bits of the data values. Each partial sum is right shifted by a corresponding amount (with the sign extension) before a final summation step that adds all partial sums together. When applied to a filter, the filter's output sample is the result of this final addition. During the next time interval, the existing data samples are downshifted in a first in first out fashion with the oldest sample being removed and a new data sample saved at a top of a FIFO. The logic for generating the partial products is combinatorial and scalable to, for example, N-bits. The architecture is also scalable for computing a matrix vector product.

As applied to matrix vector product operation, the matrix vector product value can be obtained by collecting, for example, four data streams (or three data streams) or any other suitable number, over for example, three time intervals and processing each data stream independently with a 1×4 or 1×3 coefficient vector.

In one embodiment, control logic is used to, in conjunction with a coefficient register array and a data register array wherein the coefficient register array contains a plurality of coefficients and the data register array contains the plurality of bit planes. The control logic loads a plurality of partial product generation circuits and sequences loading of corresponding coefficients and bit planes for each of the plurality of partial product summation circuits. The plurality of partial product generation circuits generate a respective partial product result on a per-bit plane basis. The partial product values are then summed to produce the dot product data.

A video decoding circuit is also disclosed employing the structure described above to, for example, generate an inverse transform matrix for luma discrete cosine transform coefficients based on samples associated with pixels that are to be displayed. The decoded pixel information, such as a 4×4 matrix corresponding to an inverse transform matrix for luma DCT coefficients that is then suitably combined with chroma DCT coefficients as known in the art to produce display pixels which are displayed on a display of a device or stored for further processing.

Among other advantages, storage devices such as registers are used to hold coefficient values and incoming data values. A final output is not generated via a lookup operation. Each bit column in an incoming set of data values (N-bit data words) forms an independent bit plane. Each bit plane is used to generate its own partial sum (i.e., partial product value). N partial sums are processed in parallel, instead of for example, grouping pairs of partial sums. The sign bit in each data word also forms a bit plane. The coefficients are used directly in the formation of each partial sum and successive pairs of coefficients are not added or subtracted as in some prior techniques. The disclosed architecture may be used, for example, in any suitable filtering implementations, processor instructions, image processing accelerators, or for any application specific integrated circuit or hardware implementations that employ vector dot product arithmetic or matrix vector product arithmetic. Examples may include for example, GSM/EDG/3G receivers, selectivity finite impulse response filtering circuits or in the context of image processing, in MPEG encoding and decoding or other suitable coding based image systems, or any other suitable systems or applications as desired.

Figure 1:
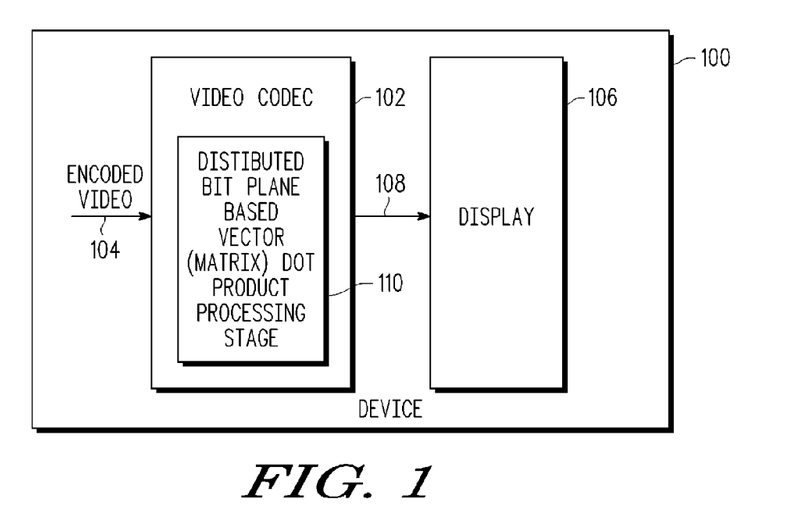
FIG. 1 is a block diagram of a device that includes a circuit in accordance with one embodiment of the invention.

FIG. 1 illustrates one example of a device 100, such as but not limited to for example, a cell phone, digital video display device, or any other suitable device. In this example, the device 100 includes a video coder/decoder 102 that receives encoded video 104 such as video encoded in MPEG 4 format or any other suitable encoding format and also includes a display 106 to display decoded pixels 108. Other device circuitry, as known in the art, such as a CPU, microcontroller, DSP, or other digital processing circuits and associated memory that stores instructions that when executed, cause the one or more processing devices to carry out operations of the device as well as other input/output interfaces and other known structures are not disclosed for purposes of simplicity.

In this example, the video codec 102 may be for example, an integrated circuit or any other suitable structure as desired. The video coder/decoder 102 includes a circuit operating as a distributed bit plane based vector (and/or matrix) dot product processing stage 110 that is used as part of the video decoding process to decode the encoded video 104 to produce the decoded pixels 108. The circuitry 110 is operative to load bit planes and use the loaded bit planes to generate a plurality of partial products directly wherein the partial products are computed in real time and are not read out of memory. The circuit 110 may be integrated with any other suitable circuits as part of an integrated circuit and may be, for example, integrated as part of a digital signal processor, video decoder, or any other suitable structure as desired.

Figure 2:
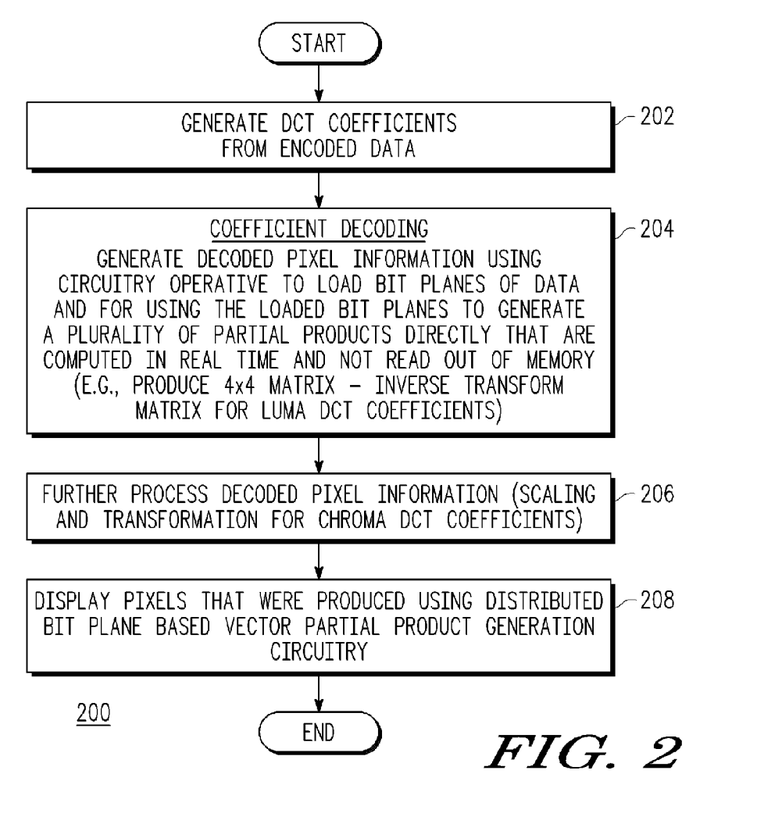
FIG. 2 is a flowchart illustrating one example of a method for generating vector dot products and/or matrix vector products in accordance with one embodiment of the invention.

FIG. 2 is a flowchart illustrating one example of a method 200 for decoding encoded video data for display on display 106. The method 200 may be carried out, for example, by the video codec 102 and display 106, or any other suitable structure. By way of example, the video codec 102 may include a video MPEG 4 decoder that, as known in the art, may receive encoded data 104 and generate discrete cosine transform coefficients from the encoded data as shown in block 202. This may be in the form of, for example, DCT coefficients in a 4×4 matrix or in any other suitable format. As shown in block 204, the method includes decoding the DCT coefficients. This process may be carried out, for example, by the distributed bit plane based vector dot product processing stage 110 (FIG. 1). As shown, the method includes generating decoded pixel information such as a 4×4 matrix representing an inverse transform matrix for luma DCT coefficients, using circuitry 110 that loads bit plane of data and uses the load of bit planes to generate a plurality of partial products directly.

As shown in block 206, the method includes using the decoded pixel information such as inverse transform matrix for luma DCT coefficients to produce a finally decoded pixel 108. As such, block 206 illustrates further processing of the decoded pixel information generated by the circuit 110. This may include, for example, scaling and transformation operations, as known in the art to produce chroma DCT coefficients and to produce a block of decoded pixels 108. As shown in block 208, the method includes displaying the pixels that were produced using the distributed bit plane based vector partial product generation circuitry 110. The method may continue as desired to generate image information for display or further processing. It will be recognized that the above method and applications are but one example that employs the circuitry 110 that is operative to load bit planes of data and for using the loaded bit planes to generate a plurality of partial products directly to compute fixed point vector dot products and/or matrix vector products. However, the circuit 110 may be employed for any suitable application.

Figure 3:
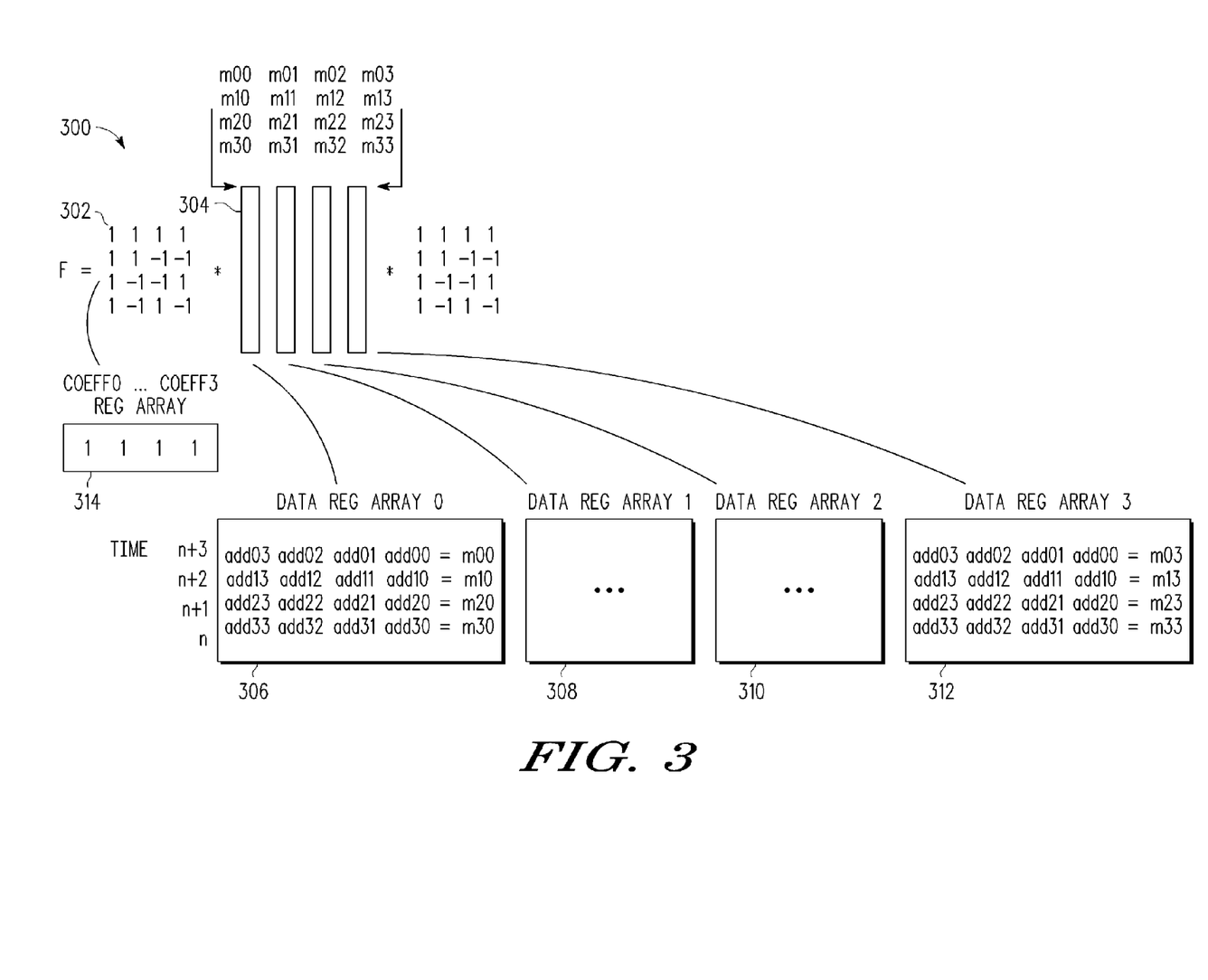
FIG. 3 is a block diagram illustrating one example of a portion of a fixed point vector dot product generation circuit in accordance with one embodiment of the invention.

FIG. 3 is a block diagram illustrating one example of a vector dot product generation circuit applied, for example, to MPEG video information. The dot product values are used in scaling and transformation of luma discrete cosine transform (DCT) coefficients for intra 16×16 macroblock types in this example. The matrix F 300 is a 4×4 matrix and DCT pixel coefficient values m00 . . . m33 are stored as 4×4 matrices of fixed point (4, 0, t) values. Vectors 302 and 304 are processed, for example, by vector dot product generation circuits that operate in parallel. As such, the vectors 302 and 304 are processed by a first partial product generating circuit, a second partial product generating circuit operates in parallel on column m01 . . . m31 and vector 302, a third partial product generating circuit operates on column m02 . . . m32 and the vector 302 and a fourth partial product generation circuit operates on m03 . . . m33 and the vector 302. Data register array 306 illustrates a bit level representation of m00-m30. Each DCT m value uses the (4, 0, t) format. Each addXY register stores a bit from mXY. Other data registers 308, 310 and 312 are used for each of the bit planes. A register array 314 stores weighting values (Wv0 ... Wv3) shown in vector 302. As also shown, data register arrays 308, 310 and 312 have the same bit planes as data register array 306. DCT values m30, m31, m32, m33 flow into the arrays at cycle n. At cycle n+1, DCT values m20, m21, m22, m23 are loaded into the arrays and so on. The coefficient values m00 ... m33 change for each macroblock. The product of Wv0 ... Wv3 and each array is complete at cycle n+3 (see also, FIG. 4). The Wv0 ... Wv3 register array 312 is next updated with values 1, 1, −1, −1 and in the next four cycles, the data register arrays 306-312 produce the second row of products. The product of the two matrices on the left of the diagram therefore take sixteen cycles. The resulting matrix is then multiplied in a similar fashion with the third matrix on the right side. This is also completed in sixteen cycles. The complete product of all three matrices is therefore done in thirty-two cycles, with four parallel distributed vector dot product generating circuits.

Figure 4:
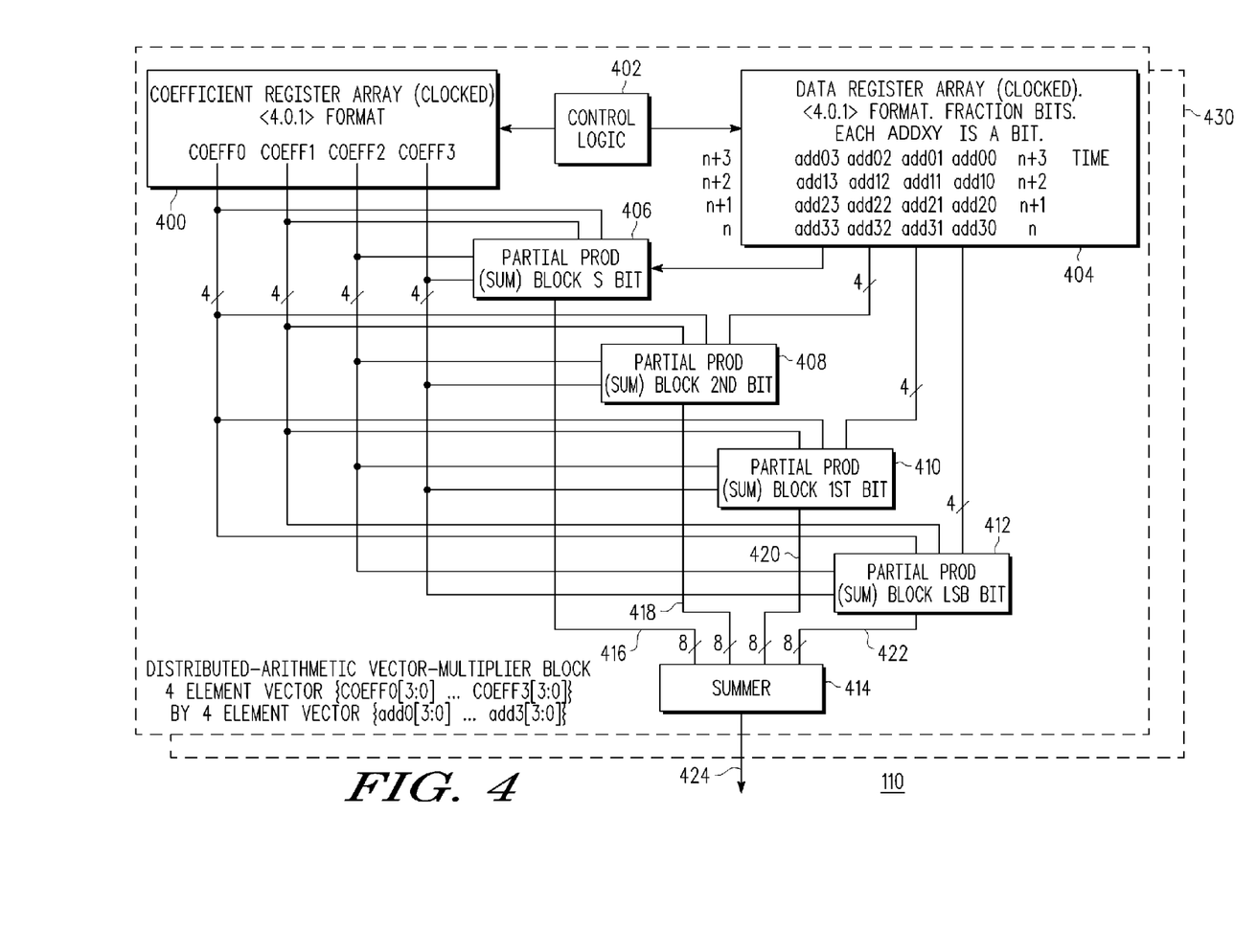
FIG. 4 is a block diagram illustrating one example of circuitry operative to generate a plurality of partial products in accordance with one embodiment of the invention.
Figure 9:
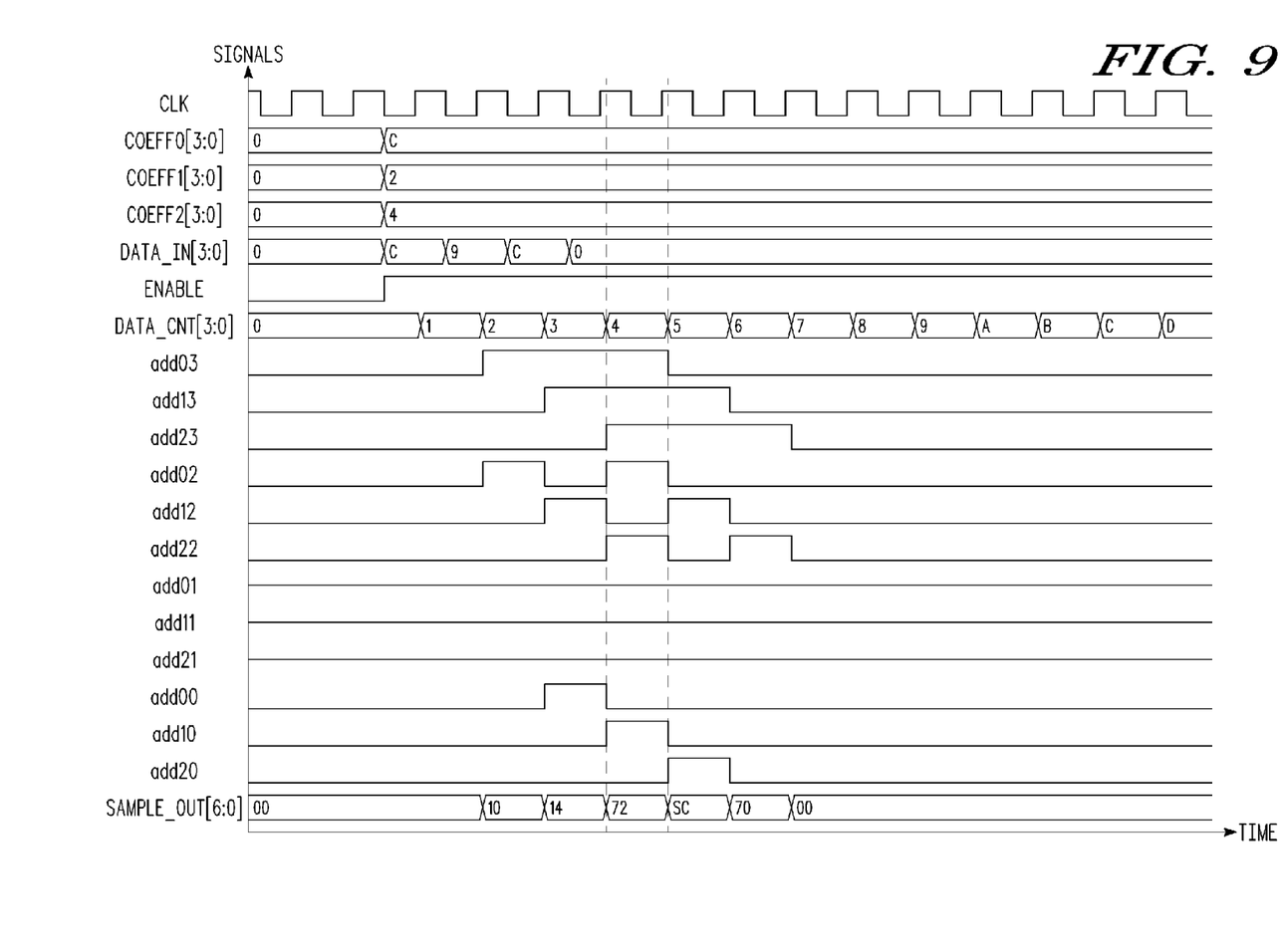
FIG. 9 is a timing diagram illustrating one example of the operation of a fixed point vector dot product generator of the type illustrated in FIG. 4.

FIG. 4 illustrates one example of the circuit 110 that in this example, employs a four element weighted value vector and four element data vectors. The circuitry 110 includes in this example, a weighted value register array 400, control logic 402, a data register array 404, a plurality of partial product generation circuits 406, 408, 410, 412 and summing logic 414. Each of the plurality of partial product generation circuits 406-412 produce a respective partial product 416, 418, 420 and 422. The summing logic 414 sums the plurality of partial products 416-422 and produces fixed point vector dot product data 424 which is then, for example, used for further processing depending upon the application. As shown in this example, each of the partial products is an 8 bit word. Each weighted value stored in register array 400 (Wv0-Wv3) is a 4 bit weighting value. Bit plane (ADD03, ADD13, ADD23, ADD33) is provided, for example, to the partial product generation circuit 406 under control of control logic 402. Each pixel data element for example, ADD03 is also shown to be 4 bits. However, any suitable bit length may be used for the various data. The data register array 404 includes a plurality of bit planes for example, ADD00-ADD30, ADD01-ADD31, ADD02-ADD32, and ADD03-ADD33. These bit planes are represented in this example as columns in the data register array 404. Multiple bit planes are loaded in parallel into respective partial product generation circuits. As shown, at time n ADD33, ADD32, ADD31, and ADD30 are loaded into respective partial product generation circuits 406-412. This is done under control of the control logic 402. The control logic 402 is also operative to load the respective weighting values from the register array 400 for the respective partial product generation blocks 406 and 412. Sequencing of the loading and the operation of the control logic 402 can be better understood with reference to FIG. 9 described below.

The circuit 110 through the control logic 402, the partial product generation circuits, the coefficient register array and data register array, load bit planes of data and use the loaded bit planes to generate a plurality of partial products 416-422, directly and that are computed in real time and are not read out of addressable memory. As shown in this example, four clock cycles are used to load all of the bit planes for all the partial product generation circuits and another clock cycle may be used by the summation logic 414 to produce the fixed point vector dot product data 424. The control logic 402 is coupled to the register array 400 and the data register array 404 and sequences a loading of corresponding weighting values from the register array 400 and data bits (e.g., ADD03, etc.) from the data register array for each of the plurality of partial product generation circuits 406-412. In an FIR filtering embodiment where coefficients are used instead of weighting values, the register array 400 serves as a coefficient register array. The plurality of partial product generation circuits 406-412 generate a respective partial product result 416-422 on a per-bit plane basis. As shown, each of the partial product generation circuits 406-412 is operatively coupled to the data register array 404 and coefficient register array 400 and produce an output that is received by the summation logic 414. It will recognized that the circuit 110 is replicated four times in this example once for each vector although the additional circuits are not shown. A single instance of the register array 400 is used. The control logic 402 may be discrete logic, one or more suitably programmed processing circuits or any suitable structure and may be replicated for each circuit 110. The replicated circuits are shown as circuits 430.

FIGS. 5-8 illustrate examples of respective partial product generation circuits 406-412 as used in an FIR filtering application. It will be noted that in this example, the respective partial product generation circuits are only shown to process three data words of a bit plane whereas FIG. 4 shows four data words per bit plane. Also, it will be recognized that the coefficient vector in this example is a 1×3 coefficient vector whereas FIG. 4 shows a 1×4 weighting value vector. It will be recognized to one of ordinary skill in the art that appropriate additional addition and multiplexing stages and shifting to the right additional bit positions may be required depending upon the number of data words employed in a bit plane. In this example, coef0 etc. refers to a 4 bit element whereas addXY refers to a single bit of an element.

Figure 5:
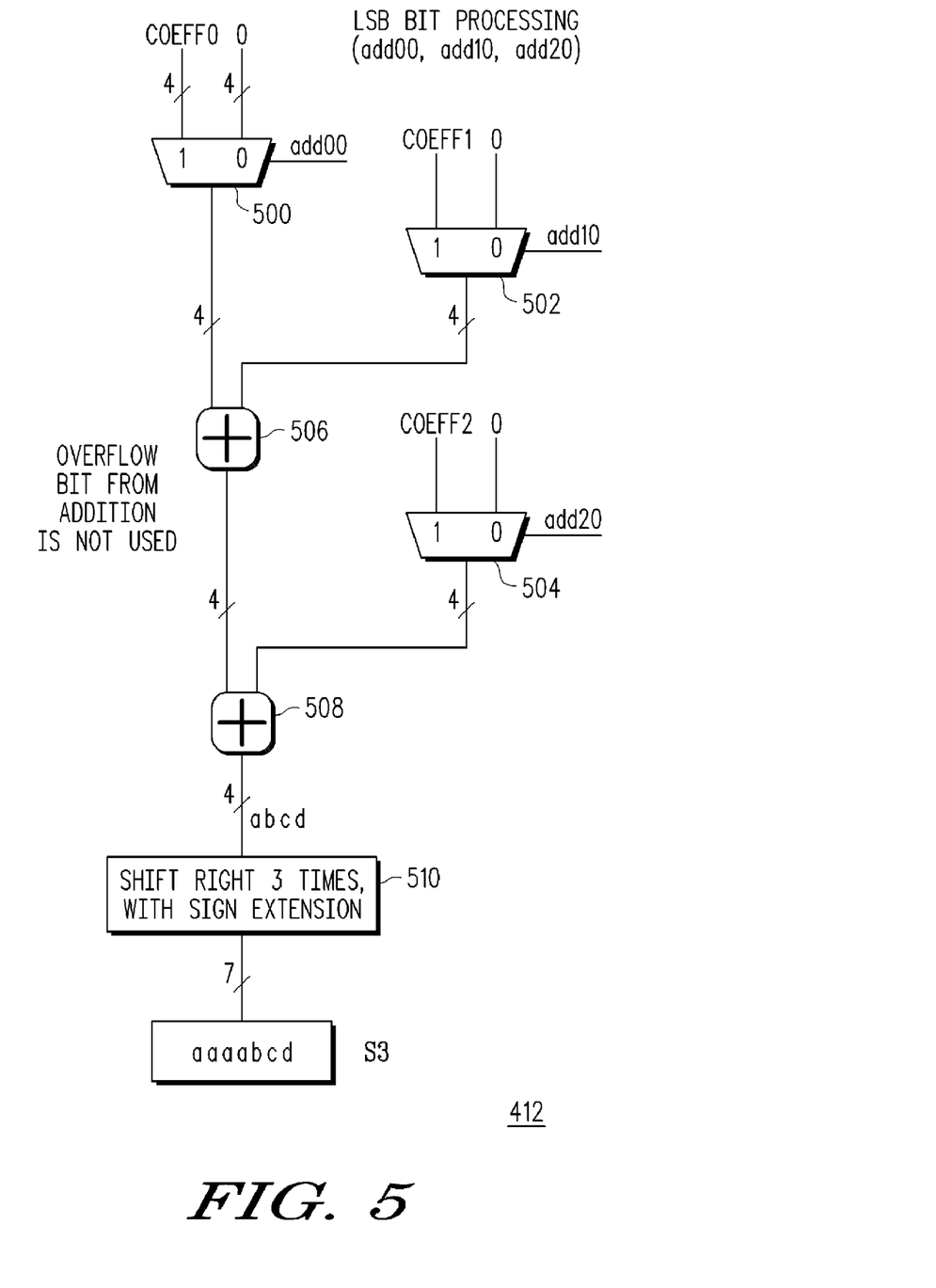
FIGS. 5, 6, 7 and 8 are block diagrams illustrating one example of partial product generators in accordance with one embodiment of the invention.
Figure 6:
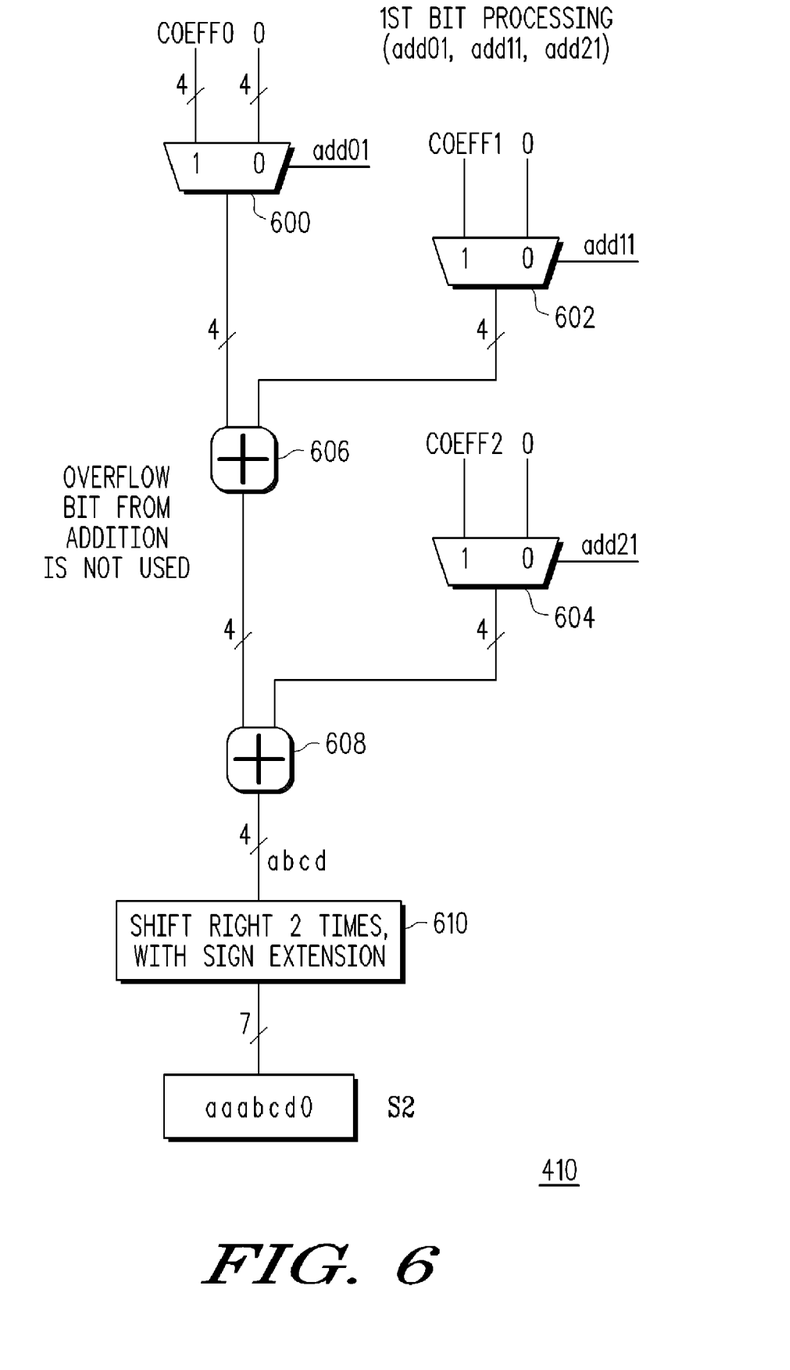
Figure 7:
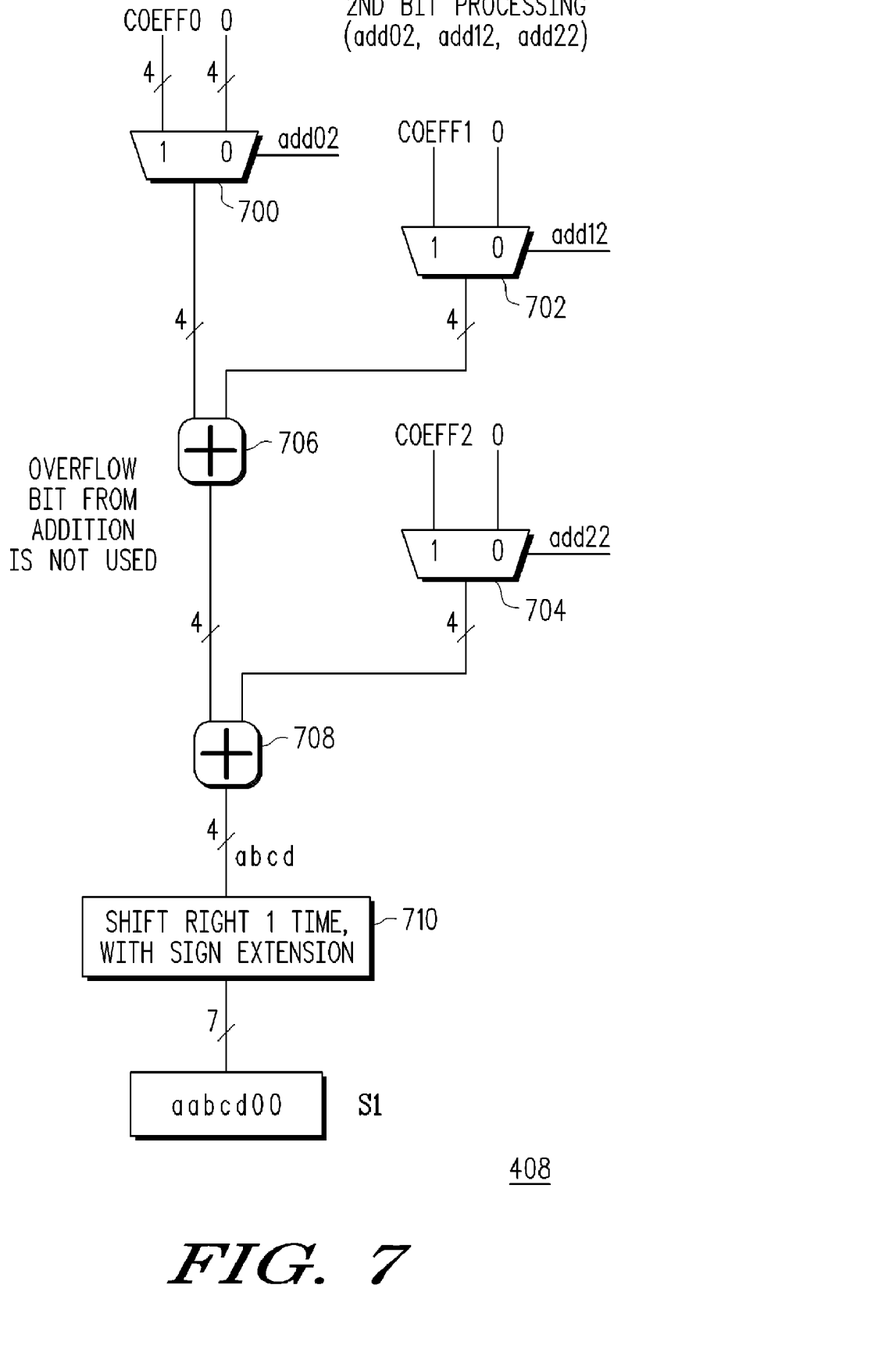
Figure 8:
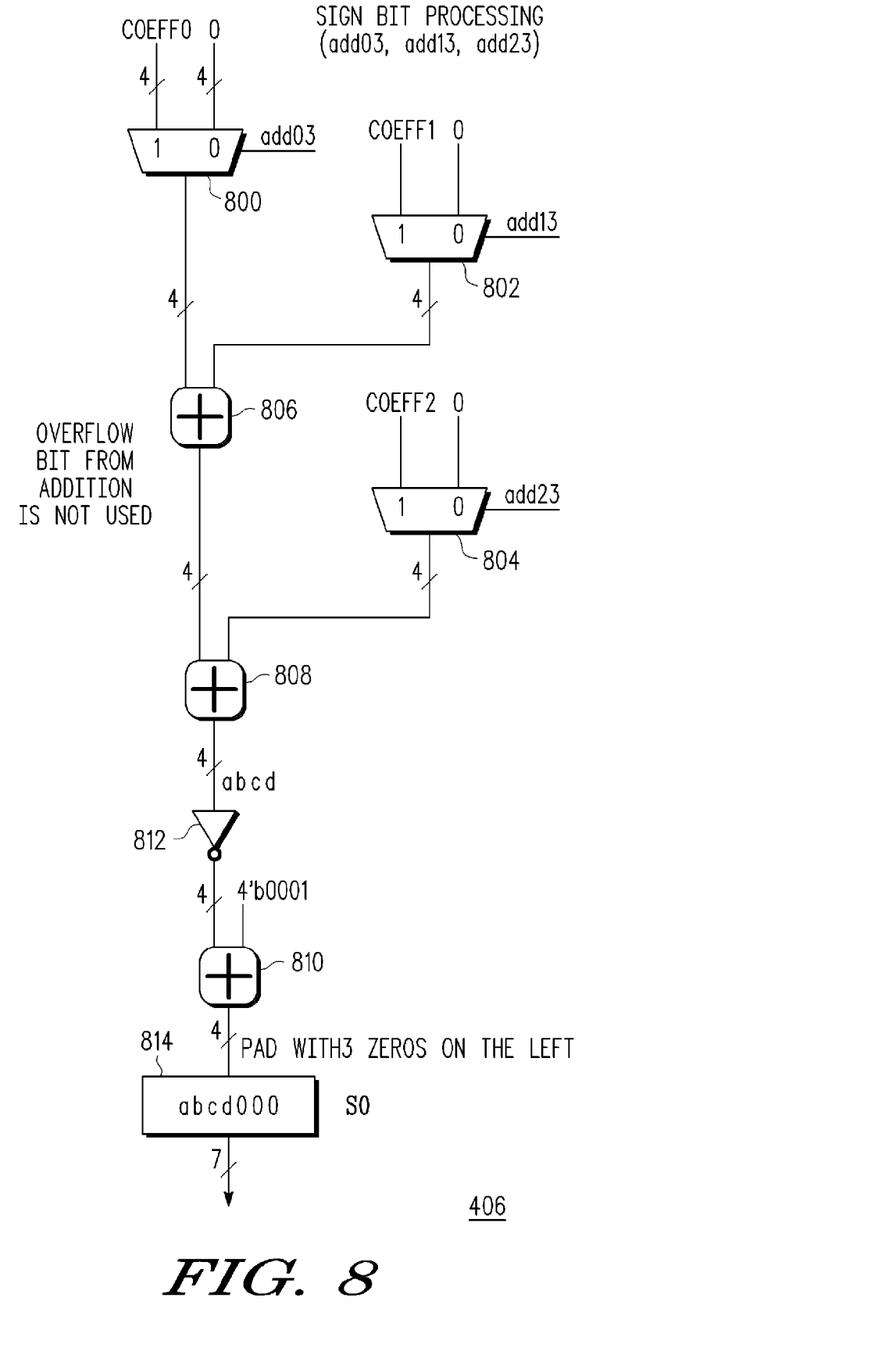

FIG. 5 illustrates one example of the partial product generation circuit 412, FIG. 6 illustrates one example of a partial product generation block 410, FIG. 7 illustrates an example of a partial product generation block 408 and FIG. 8 illustrates one example of a partial product generation block 406 that serves as a sign bit processing circuit. As shown in the partial product generation circuits 406-412 operate in parallel.

Each of the plurality of partial product generation circuits 406-412 serves as individual multiplier circuits that each include a switching structure, in this example represented by multiplexers 500, 502, 504, 600, 602, 604, 700, 702, 704, 800, 802 and 804. However, it will be recognized that any suitable structure may be used and that the switching structure may include more or fewer multiplexers (e.g., switches) depending upon the application. The switching structure includes inputs that receive the coefficients (e.g., COEFF0-COEFF2) from the (coefficient register) array 400. The switching structures are controlled by the bit plane data (e.g., ADD03-ADD33) add sequenced from the data register array 404 as shown. In addition, the multiplier circuits also referred to as the partial product generation circuits 406, 408, 410, 412, each include a plurality of adder stages coupled to outputs of the switching structure. In this example, partial product generation circuits 410, 412, and 408 each include two adder stages shown as 506, 508, 606, 608, 706 and 708 respectively. The sign bit processing circuit, also referred to as partial product generation circuit 406, in this example includes three adder stages 806, 808 and 810. However, it will be recognized that any suitable number of adder stages may also be employed.

Also in this example, partial product generation circuits 408, 410 and 412 each include arithmetic combinatorial bit shifting logic 510, 610, and 710, which may be for example, combinatorial logic, that shift data in this example, to the right with sign extensions and with no usage of a clock element. The bit shifting logic 510, 610 and 710 are coupled to an output of a last adder stage. The partial product generation circuits also include the sign bit processing circuit, in this example partial product generation circuit 406, that has a switching structure that has inputs that receive the coefficients from the coefficient register array and is also operatively controlled by the data of the bit planes. The partial product generation circuit 406 also includes in this example, an inverter 812 interposed between the last adder stage and the previous adder stage 808 and 810. Also in this example, a bit padding stage 814 pads with, for example, three zeros on the left of the partial product value. It will be recognized that any desired number of filler bits may also be used. In addition, the overflow bits from the adder stages above are not used.

In operation, the control logic 402 controls (see FIG. 9) the loading of coefficient vectors and data in the data register array into the partial product generation circuits as shown in the timing diagram. As shown, coefficients are loaded into the coefficient register array first. In subsequent clock cycles, the data register array is enabled and the data is then loaded in, for example, four clock cycles such that all bit planes are provided for the partial product generation blocks or circuits. The data coefficient may be from any suitable source such as on system boot up from a ROM/RAM if the values are constant and known. Alternatively, values may be generated by other logic which then writes them into the registers. A CPU DMA controller may be used for example, where a video decoder and CPU are employed.

As applied to a matrix vector multiplier example, for example, to process MPEG encoded video data, the figure illustrates that the scaling and transformation of luma data is performed using discrete cosine transform coefficients for a 16×16 macro block by way of example. The resulting fixed point vector dot product data may be, for example, a 4×4 inverse transform matrix corresponding to the luma DCT coefficients. Similar operations are utilized for a matrix vector based circuit to that described above with respect to the vector dot product circuit 110. As diagrammatically illustrated here, with multiple coefficient vectors, the data register array also includes coefficient values for each of the various coefficient vectors illustrated as columns in the diagram.

As applied to a video decoding circuit, for example, conventional discrete cosine transform logic that produces discrete cosine coefficients based on encoded data, for example, MPEG data, generates discrete transform coefficient matrix data from the encoded video data as known in the art. The circuit 110 is then used to generate decoded pixel information in the form of inverse transform matrix data for luma discrete cosine transformation coefficients from the discrete transformation coefficient matrix data by utilizing vector multipliers (partial product generation circuits) as set froth above that load bit planes of data and transform coefficients from a coefficient data array and use the loaded bit planes and transform coefficients to generate a plurality of partial products directly wherein the plurality of partial products are computed in real time and are not read out of memory. The circuit 110 generates blocks of decoded pixel information using the decoded pixel information in the form of inverse transform matrix data for luma discrete cosine transformation coefficients and passes the information to a subsequent processing stage such as a scaling and transformation block that produces chroma DCT coefficients, as known in the art. As known in the art, further processing then produces the display pixels that are displayed, for example, on a display device.

Among other advantages, the above structure and method can facilitate a distributed vector dot product computation for video data or other data that operates on bit planes separately to generate separate dot product values. Such circuits and method need not employ lookup tables. Each bit plane is used to generate its own partial product value or partial sum. N partial sums are processed in parallel and then added together by summing logic, instead of for example, grouping pairs of partial sums or other techniques. A sign bit in each word also forms a bit plane. Filter coefficients, for example, are used directly in the formation of each partial sum and successive pairs of coefficients are not added or subtracted as in prior techniques. Other differences and advantages will be recognized by those of ordinary skill in the art.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit for computing fixed point vector dot products comprising:
    circuitry operative to loading bit planes of data and for using the loaded bit planes to generate a plurality of partial products directly wherein the plurality of partial products are computed in real time and are not read out of addressable memory; and
    circuitry operative to generate decoded pixel information from transform coefficients generated from encoded video data using the circuitry operative to load bit planes of data wherein the data comprises transform coefficients and weighting values and for using the loaded bit planes and weighting values to generate the plurality of partial products.

2. The integrated circuit of claim 1 wherein the circuitry operative to load bit planes of data and for using the loaded bit planes to generate a plurality of partial products directly comprises summing logic operative to sum the plurality of partial products to produce fixed point vector dot product data.

3. The integrated circuit of claim 1 wherein the circuitry operative to load bit planes and for using the loaded bit planes to generate a plurality of partial products directly comprises:
    a plurality of partial product generation circuits;
    a coefficient register array containing at least a plurality of coefficients or weighting values;
    a data register array containing at least a portion of a plurality of bit planes; and
    control logic operatively coupled to the register array and the data register array and operative to sequence loading of corresponding coefficients or weighting values and data bits for each of the plurality of partial product generation circuits.

4. The integrated circuit of claim 3 wherein the plurality of partial product generation circuits generate a respective partial product result on a per bit plane basis.

5. The integrated circuit of claim 3 wherein each of the plurality of partial product generation circuits comprises:
    at least a first multiplier circuit comprising a switching structure having inputs operatively coupled to receive coefficients from the coefficient register array and operatively controlled by data of a bit plane; and
    a plurality of adder stages operatively coupled to outputs of the switching structure.

6. The integrated circuit of claim 5 wherein the plurality of partial product generation circuits comprises bit shifting logic operatively coupled to an output of a last adder stage and further comprising a sign bit processing circuit comprising a switching structure having inputs operatively coupled to receive coefficients from the coefficient register array and operatively controlled by data of a bit plane; and
 a plurality of adder stages operatively coupled to outputs of the switching structure; an inverter operatively coupled to an output of a last adder stage of the plurality of adder stages and an adder coupled to receive an output of the inverter.

7. The integrated circuit of claim 1 comprising circuitry operative to generate the transform coefficients based on encoded video data and wherein the circuitry operative to load bit planes of transform coefficients and weighting values and for using the loaded bit planes and transform coefficients to generate a plurality of partial products directly comprises summing logic operative to sum the plurality of partial products to produce decoded pixel information based on fixed point vector dot product data.

8. The integrated circuit of claim 1 wherein the circuitry operative to load bit planes and for using the loaded bit planes to generate a plurality of partial products directly comprises:
 a plurality of partial product generation circuits;
 a coefficient register array containing at least a plurality of weighting values;
 a data register array containing at least a portion of a plurality of bit planes of transform coefficients; and
 control logic operatively coupled to the register array and the data register array and operative to sequence loading of corresponding coefficients and data bits for each of the plurality of partial product generation circuits;
 and wherein the plurality of partial product generation circuits generate a respective partial product result on a per bit plane basis to produce a portion of luma inverse transform coefficient data.

9. The integrated circuit of claim 1 comprising chroma transform coefficient logic operative to produce pixel data for display or further processing based on the luma inverse transform coefficient data.

10. A video decoding circuit comprising:
 discrete cosine transform logic operative to generate discrete transform coefficient matrix data from encoded video data;
 circuitry operative to generate decoded pixel information in the form of inverse transform matrix data for luma discrete cosine transformation coefficients from the discrete transform coefficient matrix data comprising:
  vector multipliers that include circuitry operative to load bit planes of data transform coefficients and weighting values and for using the loaded bit planes of transform coefficients to generate a plurality of partial products directly wherein the plurality of partial products are computed in real time; and
  circuitry operative to generate blocks of decoded pixels using the decoded pixel information in the form of inverse transform matrix data for luma discrete cosine transformation coefficients.

11. The video decoding circuit of claim 10 wherein the circuitry operative to load bit planes and for using the loaded bit planes to generate a plurality of partial products directly comprises:
 a plurality of partial product generation circuits;
 a coefficient register array containing at least a plurality of weighting values;
 a data register array containing at least a portion of a plurality of bit planes of transform coefficients; and
 control logic operatively coupled to the register array and the data register array and operative to sequence loading of corresponding coefficients and data bits for each of the plurality of partial product generation circuits.

12. The video decoding circuit of claim 11 wherein the plurality of partial product generation circuits generate a respective partial product result on a per bit plane basis to produce a portion of luma inverse transform coefficient data.

13. A method comprising:
 generating discrete cosine transformation coefficients associated with a block of encoded video data;
 generating decoded pixel information using circuitry operative to load bit planes of data and for using the loaded bit planes to generate a plurality of partial products directly wherein the plurality of partial products are computed in real time and are not read out of addressable memory;
 further processing the decoded pixel information to produce decoded pixels for output to a display; and
 displaying the decoded pixels on a display.

14. The method of claim 13 comprising sequencing loading of corresponding discrete cosine coefficients and data bits for each of a plurality of partial product generation circuits.

15. The method of claim 13 wherein generating decoded pixel information comprises generating a respective partial product result on a per bit plane basis to produce a portion of luma inverse transform coefficient data.

16. The method of claim 13 comprising loading discrete cosine transform coefficients into a coefficient register array prior to providing the bit planes to partial product generation circuits.

17. The method of claim 16 comprising, in subsequent clock cycles, enabling a data register array to provide bit planes for each of a respective partial product generation circuit.

18. The method of claim 17 comprising summing a plurality of partial products produced by the respective partial product generation circuits to produce fixed point vector dot product data.

19. The method of claim 18 comprising using the fixed point vector dot product data to produce pixel information.

* * * * *